United States Patent Office

3,272,837
Patented Sept. 13, 1966

---

3,272,837
SUBSTITUTED TETRAHYDROPYRIDINES AND PROCESS THEREFOR
Marshall D. Draper, Woodland Hills, Calif., assignor to Rexall Drug and Chemical Company, Los Angeles, Calif., a corporation of Delaware
No Drawing. Filed Oct. 30, 1964, Ser. No. 407,846
13 Claims. (Cl. 260—297)

This application is a continuation-in-part of my application entitled, "Substituted Tetrahydropyridines and Process Therefor," Serial No. 371,791, filed June 1, 1964, now abandoned, which is in turn a continuation-in-part of my application entitled, "Substituted Tetrahydropyridines," Serial No. 310,890, filed September 23, 1963, now abandoned.

This invention relates to compositions of matter classified in the art of chemistry as substituted tetrahydropyridines and to a process for their preparation.

The invention sought to be patented, in its product composition aspect, is described as residing in the concept of a chemical compound in which there is attached at the 1-position of a 3-(α-hydroxybenzyl)-4-phenyl-1,2,3,6-tetrahydropyridine nucleus, a lower alkyl, lower alkenyl or phenyl-lower alkyl group, and to its hereinafter disclosed equivalents.

The invention sought to be patented, in its process aspect, is described as residing in the concept of refluxing a 3-benzoyl-4-phenyl-1,2,3,6-tetrahydropyridine bearing a lower alkyl, lower alkenyl or phenyl-lower alkyl group at the 1-position, or its hereinafter described equivalents, with an alkali metal aluminohydride reducing agent in the presence of aluminum chloride or with an alkali metal borohydride reducing agent thereby to form the tangible embodiments of this invention in its product composition aspect.

As used throughout the specification and claims, the term "lower alkyl" embraces both straight and branched chain alkyl radicals having from 1 to 6 carbon atoms for example methyl, ethyl, n-propyl, isopropyl, n-hexyl, 2-ethylbutyl and the like; the term "lower alkenyl" denotes a monovalent radical $C_nH_{2n-1}$ wherein $n$ is an integer from 3 to 6, for example allyl, butenyl, hexenyl and the like; the term "phenyl-lower alkyl" denotes a radical wherein phenyl is substituted for a hydrogen atom of a lower alkyl substituent, for example benzyl, phenethyl, α-methyl benzyl, phenyl-n-propyl and the like; the term "lower alkoxy" denotes alkoxy groups containing from 1 to 6 carbon atoms, for example, methoxy, ethoxy, isopropoxy, n-butoxy, n-hexyloxy and the like and the term "halo" embraces chloro, bromo, fluoro and iodo.

The tangible embodiments of this invention, in its product composition aspect, possess the inherent general physical characteristics of being solid crystalline materials. Spectral data and elemental analyses, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity as diuretic agents as determined by recognized and accepted pharmacological test procedures, as well as being useful and valuable as chemical intermediates in the production of other substituted tetrahydropyridines. For example, tosylation of the tangible embodiments of this invention having a lower alkyl group at the 1-position followed by reduction with a metal hydride reducing agent yields substituted 1,2,5,6-tetrahydropyridines having the formula:

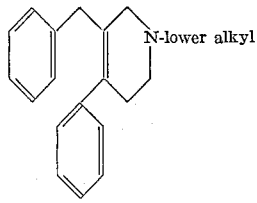

or their equivalents. Such compounds are described and claimed in my application Serial No. 310,915, filed September 23, 1963, now abandoned, entitled, "Substituted Indenopyridines and Process Therefor."

The manner and process of making and using the invention will now be generally described so as to enable a person skilled in the art of chemistry to make and use the same as follows:

The reaction sequence leading to the tangible embodiments of this invention, in its product composition aspect, and depicting the invention sought to be patented in its process aspect is set forth as follows:

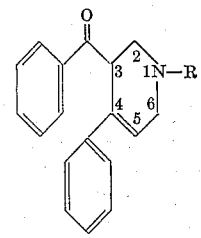

Starting Material $$\downarrow \begin{array}{c} \text{LiAlH}_4 \\ + \\ \text{AlCl}_3 \end{array}$$

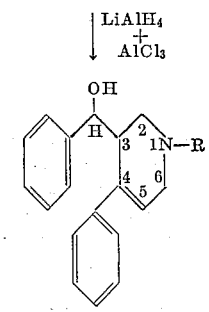

Final Product wherein R is lower alkyl, lower alkenyl or phenyl-lower alkyl.

The starting materials depicted hereinabove are readily prepared by known chemical processes, for example by dehydration of 1-R-3-benzoyl-4-hydroxy-4-phenylpiperidines by heating with acetic anhydride and sulfuric acid, Starting materials wherein the benzoyl radical and/or the phenyl radical at the 3- and 4-positions, respectively, of the tetrahydropyridine nucleus are nuclearly substituted with one or more lower alkyl, lower alkoxy or halogen groups and/or starting materials having a phenyl-lower alkyl R-substituent in which the phenyl group is nuclearly substituted with one or more lower alkyl, lower alkoxy or halogen groups are prepared by analogous processes and are the full equivalents of the specific starting materials depicted hereinabove. Their use in the foregoing reaction sequence results in the preparation of final products having the same utility as the specific final products depicted hereinabove.

The starting material is converted to the tangible embodiments of this invention by treatment with an alkali metal borohydride reducing agent, such as sodium or potassium borohydride, in the presence of an inert organic solvent such as methanol, ethanol, and the like, at from room temperature to the reflux temperature of the solvent, or by treatment with an alkali metal aluminohydride, such as lithium aluminum hydride, in combination with aluminum chloride, at reflux temperature in the presence of an inert organic solvent such as ether, dioxan, tetrahydrofuran and the like, resulting in the selective reduction of the carbonyl function in the benzoyl group at the 3-position of the starting materials to yield the substituted tetrahydropyridines which constitute the tangible embodiments of this invention in its product composition aspect. Upon completion of the reaction, residual reducing agent is decomposed by the addition of water and alkali and the product is recovered from the solution by conventional techniques of crystallization.

The tangible embodiments of this invention, in its product composition aspect, can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as the citrate, tartrate, malate, maleate and fumarate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers, to form such dosage forms as tablets, capsules, solutions, suspensions, suppositories and the like.

The best mode contemplated by the inventor for carrying out this invention will now be set forth as follows:

The following example is illustrative of the selective reduction of the carbonyl group in the starting material by treatment with an alkali metal aluminohydride reducing agent in combination with aluminum chloride.

EXAMPLE 1

3-(α-hydroxybenzyl)-1-methyl-4-phenyl-1,2,3,6-tetrahydropyridine

Dissolve lithium aluminum hydride (1 g.) in ether (100 ml.) and add aluminum chloride (5.0 g.) cautiously with stirring. Slowly add to this mixture 3-benzoyl-1-methyl-4-phenyl-1,2,3,6-tetrahydropyridine (5.0 g.) and stir for 1 hour. Add water (60 ml.) dropwise with stirring. During this addition most of the ether boils off. Basify the remaining aqueous mixture with ammonium hydroxide and filter. Digest the filter-cake thus obtained with three 100 ml. portions of hot chloroform. Wash the chloroform extracts with water, dry over anhydrous magnesium sulfate and remove the solvent in vacuo. Dry the product, which crystallizes during removal of the solvent, at 50° C. and 1 mm. Hg for 2 hours to yield 38 g. (77%) of crystalline product, M.P. 136–137° C.

*Analysis.*—Calculated for $C_{19}H_{21}NO$: C, 81.68%; H, 7.58%; N, 5.01%. Found: C, 81.69%; H, 7.68%; N, 5.01%.

The following examples are illustrative of the selective reduction of the carbonyl group in the starting material by treatment with an alkali metal borohydride reducing agent.

EXAMPLE 2

3-(α-hydroxy-p-methylbenzyl)-1-methyl-4-(p-methylphenyl)-1,2,3,6-tetrahydropyridine 1 - methyl - 3 - (p - methylbenzoyl) - 4 - (p - methylphenyl)-1,2,3,6-tetrahydropyridine (18 g., 0.056 mole) is dissolved in absolute ethanol (150 ml.) and sodium borohydride (2.2 g., 0.058 mole) is added. The solution is allowed to remain at 35° C. for about 2 hours, with intermittent gentle shaking, and then is heated to reflux temperature for 4 hours. The mixture is cooled to room temperature, about 10 ml. of water is added and the ethanol is removed under reduced pressure. The residue is taken up in ether (200 ml.) and 4% aqueous base (150 ml.) is added. The aqueous phase is twice extracted with ether (100 ml. portions) and the extracts washed with water (100 ml.). The extract is then dried over anhydrous magnesium sulfate, filtered and concentrated. The product crystallizes on cooling and is recrystallized from ether/petroleum ether to yield 12.8 g. (75%) of crystals, M.P. 120–122° C.

*Analysis.*—Calculated for $C_{21}H_{25}NO$: C, 82.20%; H, 8.22%; N, 4.57%. Found: C, 82.18%; H, 8.05%; N, 4.54%.

EXAMPLE 3

3-(α-hydroxy-p-fluorobenzyl)-1-methyl-4-(p-fluorophenyl)-1,2,3,6-tetrahydropyridine 1 - methyl - 3 - (p - fluorobenzoyl) - 4 - p - (fluorophenyl)-1,2,3,6-tetrahydropyridine (14.4 g., 0.0461 mole) and sodium borohydride (1.8 g., 0.0475 mole) are dissolved in ethanol (150 ml.) and the solution is refluxed for 3 hours. Water (10 ml.) is then added and the ethanol is removed under reduced pressure. The residue is taken up in ether (250 ml.), 2 N sodium hydroxide (100 ml.) is added and, after shaking, the aqueous phase is extracted 3 times with ether (75 ml. portions). The combined ether extracts are washed with water, dried over anhydrous magnesium sulfate and filtered. The solution is concentrated and cooled. The crystalline product which appears upon cooling is recovered by filtration, washed with petroleum ether and dried in vacuo to yield 7.75 g. (53%) product, M.P. 160–162° C.

*Analysis.*—Calculated for $C_{19}H_{19}F_2NO$: C, 72.50%; H, 6.03%; N, 4.45%. Found: C, 72.30%; H, 6.04%; N, 4.52%.

EXAMPLE 4

3-(α-hydroxy-p-methoxybenzyl)-1-methyl-4-(p-methoxyphenyl)-1,2,3,6-tetrahydropyridine 1-methyl-3-(p-methoxybenzoyl) - 4 - p-methoxyphenyl-1,2,3,6-tetrahydropyridine (19.5 g., 0.058 mole) and sodium borohydride (2.4 g., 0.0637 mole) are mixed with methanol (100 ml.) and the mixture is refluxed for 30 minutes. The mixture is cooled to room temperature, water (25 ml.) is added and the solution concentrated. The residual oil emulsion is mixed with 1 N sodium hydroxide (25 ml.). The aqueous phase is extracted with ether. The product is then recovered by filtration and crystallization in a yield of 13.0 g. (66%), M.P. 101° C.

*Analysis.*—Calculated for $C_{21}H_{25}NO_3$: C, 74.40%; H, 7.43%; N, 4.13%. Found: C, 74.53%; H, 7.37%; N, 3.99%.

EXAMPLE 5

*1-allyl-3-(α-hydroxy-p-chlorobenzyl-4-(p-chlorophenyl)-1,2,3,6-tetrahydropyridine*

1-allyl-3-(p-chlorobenzoyl) - 4 - (p - chlorophenyl)-1,2,3,6-tetrahydropyridine (8 g., 0.0215 mole) and sodium borohydride (0.9 g., 0.0248 mole) are refluxed in a mixture of absolute ethanol (50 ml.) and tetrahydrofuran (10 ml.) for 2 hours. After cooling, water and base (30 ml. 1 N sodium hydroxide) are added to decompose residual reducing agent and the product is recovered and isolated by extraction, filtration and crystallization in a yield of 3.4 g., M.P. 151–152.5° C.

*Analysis.*—Calculated for $C_{21}H_{21}NOCl_2$: C, 67.50%; H, 5.66%; N, 3.75%; Cl, 18.95%. Found: C, 67.40%; H, 5.74%; N, 3.90%; Cl, 18.77%.

EXAMPLE 6

*1-allyl-3-(α-hydroxy-p-methoxybenzyl)-4-(p-methoxyphenyl)-1,2,3,6-tetrahydropyridine*

1-allyl-3-(p-methoxybenzoyl) - 4 - (p - methoxyphenyl)-1,2,3,6-tetrahydropyridine (6.0 g., 0.016 mole) is dissolved in 95% ethanol (60 ml.) and sodium borohydride (0.62 g., 0.016 mole) is added with vigorous stirring. A precipitate forms immediately. Stirring of the mixture in continued at room temperature for an additional 30 minutes after the addition of 95% ethanol (20 ml.). Water is added and the product is recovered by filtration, washed with water and dried. Yield is 5.5 g. (91%), M.P. 92–93° C.

*Analysis.*—Calculated for $C_{23}H_{27}NO_3$: C, 75.59%; H, 7.46%; N, 3.84%. Found: C, 76.07%; H, 7.87%; N, 3.84%.

EXAMPLE 7

*1-benzyl-3-(α-hydroxy-p-methoxybenzyl)-4-(p-methoxyphenyl)-1,2,3,6-tetrahydropyridine*

1-benzyl - 3 - (p - methoxybenzoyl) - 4 - (p-methoxyphenyl)-1,2,3,6-pyridine (9.8 g., 0.0237 mole) is dissolved in tetrahydrofurane (100 ml.) and sodium borohydride (0.95 g., 0.025 mole) is added. The mixture is stirred at room temperature for 1½ hours and then at reflux for 2½ hours. Absolute ethanol (50 ml.) is added and the mixture refluxed for an additional hour. After cooling the solvents are removed under reduced pressure. To the residue is added 1 N sodium hydroxide (50 ml.) and the product is then extracted out with chloroform (three 75 ml. portions). The combined extracts are washed with water, dried over anhydrous magnesium sulfate, filtered and concentrated under reduced pressure to an oil. Crystals form after petroleum ether is added and are recovered in a yield of 8.25 g., M.P. 102–106° C.

*Analysis.*—Calculated for $C_{27}H_{29}NO_3$: C, 78.20%; H, 7.05%; N, 3.37%. Found: C, 78.47%; H, 7.01%; N, 3.35%.

The subject matter which the applicant regards as his invention is particularly pointed out and distinctly claimed as follows:

1. 1-lower alkyl - 3 - (α - hydroxybenzyl) - 4 - phenyl-1,2,3,6-tetrahydropyridine.
2. 1-lower alkenyl - 3 - (α - hydroxybenzyl) - 4-phenyl-1,2,3,6-tetrahydropyridine.
3. 1-phenyl-lower alkyl - 3 - (α - hydroxybenzyl)-4-phenyl-1,2,3,6-tetrahydropyridine.
4. 3 - (α - hydroxybenzyl) - 1 - methyl - 4 - phenyl-1,2,3,6-tetrahydropyridine.
5. 3 - (α - hydroxy - p - methylbenzyl) - 1 - methyl-4-(p-methylphenyl)-1,2,3,6-tetrahydropyridine.
6. 3 - (α - hydroxy - p - fluorobenzyl) - 1 - methyl-4-(p-fluorophenyl)-1,2,3,6-tetrahydropyridine.
7. 3-(α-hydroxy-p-methoxybenzyl)-1 - methyl - 4 - (p-methoxyphenyl)-1,2,3,6-tetrahydropyridine.
8. 1 - allyl - 3 - (α - hydroxy - p - chlorobenzyl) - 4-(p-chlorophenyl)-1,2,3,6-tetrahydropyridine.
9. 1 - allyl - 3 - (α - hydroxy - p - methoxybenzyl - 4-(p-methoxyphenyl)-1,2,3,6-tetrahydropyridine.
10. 1 - benzyl - 3 - (α - hydroxy - p - methoxybenzyl)-4-(p-methoxyphenyl)-1,2,3,6-tetrahydropyridine.
11. A method of selectively reducing the carbonyl group of a 3 - benzoyl - 4 - phenyl - 1,2,3,6 - tetrahydropyridine to form a 3 - (α - hydroxybenzyl) - 4 - phenyl - 1,2,3,6-tetrahydropyridine which comprises treating said 3-benzoyl - 4 - phenyl - 1,2,3,6 - tetrahydropyridine with a member selected from the group consisting of an alkali metal borohydride and an alkali metal aluminohydride in combination with aluminum chloride.
12. A method according to claim 11 wherein said alkali metal borohydride is sodium borohydride.
13. A method according to claim 11 wherein said alkali metal aluminohydride is lithium aluminum hydride.

No references cited.

WALTER A. MODANCE, *Primary Examiner.*

ROBERT T. BOND, *Assistant Examiner.*